(12) United States Patent
Yepes et al.

(10) Patent No.: US 12,449,128 B1
(45) Date of Patent: Oct. 21, 2025

(54) BOSS FOR A FUEL INJECTION ASSEMBLY HAVING COOLING CIRCUIT AND COMBUSTOR PROVIDED THEREWITH

(71) Applicant: GE Infrastructure Technology LLC, Greenville, SC (US)

(72) Inventors: Santiago Yepes, Greenville, SC (US); Lucas John Stoia, Taylors, SC (US); Kaitlin Marie Neville, Greenville, SC (US); Mohammad Fahd Ebna Alam, Greenville, SC (US); Dwayne Debruhl, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/962,582

(22) Filed: Nov. 27, 2024

(51) Int. Cl.
  *F23R 3/00* (2006.01)
(52) U.S. Cl.
  CPC .... *F23R 3/002* (2013.01); *F23R 2900/00018* (2013.01); *F23R 2900/03044* (2013.01)
(58) Field of Classification Search
  CPC .. F23R 3/002; F23R 3/06; F23R 2900/00018; F23R 2900/03044
  See application file for complete search history.

(56) References Cited

U.S. PATENT DOCUMENTS

| | | |
|---|---|---|
| 4,903,480 A | 2/1990 | Lee et al. |
| 5,220,787 A | 6/1993 | Bulman |
| 5,383,766 A | 1/1995 | Przirembel et al. |
| 5,640,851 A | 6/1997 | Toon et al. |
| 5,713,207 A * | 2/1998 | Ansart ............. F23R 3/002 60/757 |
| 5,813,836 A | 9/1998 | Starkweather |
| 6,047,550 A | 4/2000 | Beebe |
| 6,192,688 B1 | 2/2001 | Beebe |
| 6,206,638 B1 | 3/2001 | Glynn et al. |
| 6,868,676 B1 | 3/2005 | Haynes |

(Continued)

FOREIGN PATENT DOCUMENTS

| | | |
|---|---|---|
| EP | 1431543 A2 | 6/2004 |
| EP | 2208934 A1 | 7/2010 |

(Continued)

OTHER PUBLICATIONS

U.S. Appl. No. 18/399,838, filed Dec. 29, 2023.
U.S. Appl. No. 18/348,749, filed Jul. 7, 2023.

*Primary Examiner* — Steven M Sutherland
(74) *Attorney, Agent, or Firm* — Dority & Manning, P.A.

(57) ABSTRACT

A combustor includes a combustion liner that defines a combustion chamber and an outer sleeve spaced apart from the combustion liner, such that an annulus is defined between the combustion liner and the outer sleeve. The combustor further includes a fuel injection assembly having a boss coupled to at least one of the combustion liner and the outer sleeve. The boss includes an inner flange coupled to the combustion liner, an outer flange, and a body extending between the outer flange and the inner flange. The boss defines a cooling circuit having a post-impingement plenum defined in the inner flange between an inner wall of the inner flange and an impingement plate in cooling proximity to the inner wall; and a plurality of film cooling channels that are defined in the inner flange and fluidly couple the post-impingement plenum to the combustion chamber.

20 Claims, 10 Drawing Sheets

(56) References Cited

U.S. PATENT DOCUMENTS

| | | |
|---|---|---|
| 6,915,636 B2 | 7/2005 | Stuttaford et al. |
| 7,568,887 B1 | 8/2009 | Liang |
| 7,854,591 B2 | 12/2010 | Liang |
| 7,878,000 B2 | 2/2011 | Mancini et al. |
| 8,112,216 B2 | 2/2012 | Davis, Jr. et al. |
| 8,113,001 B2 | 2/2012 | Singh et al. |
| 8,167,559 B2 | 5/2012 | Liang |
| 8,171,735 B2 | 5/2012 | Mancini et al. |
| 8,387,391 B2 | 3/2013 | Patel et al. |
| 8,387,398 B2 | 3/2013 | Martin et al. |
| 8,402,768 B2 | 3/2013 | Syed et al. |
| 8,407,892 B2 | 4/2013 | DiCintio et al. |
| 8,438,856 B2 | 5/2013 | Chila et al. |
| 8,590,311 B2 | 11/2013 | Parsania et al. |
| 8,677,753 B2 | 3/2014 | Melton et al. |
| 8,683,808 B2 | 4/2014 | Venkataraman et al. |
| 8,701,382 B2 | 4/2014 | Davis, Jr. et al. |
| 8,701,383 B2 | 4/2014 | Venkataraman et al. |
| 8,701,418 B2 | 4/2014 | Venkataraman et al. |
| 8,707,707 B2 | 4/2014 | Venkataraman et al. |
| 8,745,987 B2 | 6/2014 | Stoia et al. |
| 8,863,525 B2 | 10/2014 | Toronto et al. |
| 8,931,280 B2 | 1/2015 | Kaleeswaran et al. |
| 8,943,831 B2 | 2/2015 | Eroglu et al. |
| 9,052,115 B2 | 6/2015 | Stoia et al. |
| 9,097,424 B2 | 8/2015 | Chen et al. |
| 9,140,455 B2 | 9/2015 | Stoia et al. |
| 9,151,500 B2 | 10/2015 | Chen et al. |
| 9,200,808 B2 | 12/2015 | Roming et al. |
| 9,212,609 B2 | 12/2015 | Twardochleb et al. |
| 9,267,436 B2 | 2/2016 | Stoia et al. |
| 9,284,888 B2 | 3/2016 | Romig et al. |
| 9,291,350 B2 | 3/2016 | Melton et al. |
| 9,303,872 B2 | 4/2016 | Hadley et al. |
| 9,310,078 B2 | 4/2016 | Chen et al. |
| 9,316,155 B2 | 4/2016 | DiCintio et al. |
| 9,316,396 B2 | 4/2016 | DiCintio et al. |
| 9,322,556 B2 | 4/2016 | Melton et al. |
| 9,360,217 B2 | 6/2016 | DiCintio et al. |
| 9,376,961 B2 | 6/2016 | Stoia et al. |
| 9,383,104 B2 | 7/2016 | Melton et al. |
| 9,400,114 B2 | 7/2016 | Melton et al. |
| 9,447,971 B2 | 9/2016 | Kim et al. |
| 9,494,321 B2 | 11/2016 | Melton et al. |
| 9,617,859 B2 | 4/2017 | Morgan et al. |
| 9,869,200 B2 | 1/2018 | Jones et al. |
| 9,938,903 B2 | 4/2018 | Hughes et al. |
| 9,945,294 B2 | 4/2018 | Hughes et al. |
| 9,945,562 B2 | 4/2018 | Hughes et al. |
| 9,976,487 B2 | 5/2018 | Hughes et al. |
| 9,989,260 B2 | 6/2018 | Hughes et al. |
| 9,995,221 B2 | 6/2018 | Hughes et al. |
| 10,006,367 B2 | 6/2018 | Romanov et al. |
| 10,100,646 B2 | 10/2018 | Propheter-Hinckley et al. |
| 10,220,474 B2 | 3/2019 | Theuer et al. |
| 10,228,138 B2 | 3/2019 | Theuer et al. |
| 10,364,681 B2 | 7/2019 | Krumanaker et al. |
| 10,513,987 B2 | 12/2019 | Hughes et al. |
| 10,690,349 B2 | 6/2020 | Natarajan et al. |
| 10,704,399 B2 | 7/2020 | Lacy et al. |
| 10,760,430 B2 | 9/2020 | Lacy et al. |
| 10,865,992 B2 | 12/2020 | DiCintio et al. |
| 10,927,680 B2 | 2/2021 | Lacy et al. |
| 11,021,969 B2 | 6/2021 | Krumanaker et al. |
| 11,041,389 B2 | 6/2021 | Lacy et al. |
| 11,067,281 B1 | 7/2021 | Garcia et al. |
| 11,187,415 B2 | 11/2021 | Jones et al. |
| 11,248,794 B2 | 2/2022 | Berry |
| 11,287,134 B2 | 3/2022 | Berry |
| 11,371,699 B2 | 6/2022 | Bolanos Chaverri et al. |
| 11,434,821 B2 | 9/2022 | Wertz |
| 11,566,536 B1 | 1/2023 | Cox |
| 11,566,790 B1 | 1/2023 | Hughes et al. |
| 11,767,766 B1 | 9/2023 | Matthews et al. |
| 2010/0077760 A1 | 4/2010 | Laster et al. |
| 2010/0212324 A1* | 8/2010 | Bronson .................. F23R 3/06 60/39.821 |
| 2011/0289928 A1 | 12/2011 | Fox et al. |
| 2012/0272659 A1 | 11/2012 | Syed et al. |
| 2013/0174558 A1 | 7/2013 | Stryapunin |
| 2014/0097276 A1 | 4/2014 | Boardman et al. |
| 2014/0190170 A1 | 7/2014 | Cai et al. |
| 2014/0260280 A1 | 9/2014 | Willis et al. |
| 2014/0260318 A1 | 9/2014 | Willis et al. |
| 2014/0360193 A1 | 12/2014 | Stoia et al. |
| 2015/0285501 A1 | 10/2015 | DiCintio et al. |
| 2016/0047317 A1 | 2/2016 | Willis et al. |
| 2017/0167728 A1 | 6/2017 | Gonyou et al. |
| 2017/0176015 A1 | 6/2017 | Kapilavai et al. |
| 2017/0268786 A1 | 9/2017 | Cai et al. |
| 2017/0292407 A1 | 10/2017 | Moga |
| 2018/0119958 A1 | 5/2018 | Hoffman et al. |
| 2018/0209651 A1 | 7/2018 | Cai et al. |
| 2018/0328587 A1 | 11/2018 | Gubba et al. |
| 2018/0328588 A1 | 11/2018 | Lemon et al. |
| 2019/0063749 A1 | 2/2019 | Zelesky et al. |
| 2019/0072279 A1 | 3/2019 | Natarajan et al. |
| 2019/0120064 A1 | 4/2019 | Jennings et al. |
| 2021/0099299 A1 | 4/2021 | Daniel |
| 2021/0199299 A1 | 7/2021 | Berry et al. |
| 2022/0099297 A1 | 3/2022 | Garcia et al. |

FOREIGN PATENT DOCUMENTS

| | | |
|---|---|---|
| EP | 3232002 A1 | 10/2017 |
| EP | 3343108 A1 | 7/2018 |
| EP | 3346187 A2 | 7/2018 |

* cited by examiner

BOSS FOR A FUEL INJECTION ASSEMBLY HAVING COOLING CIRCUIT AND COMBUSTOR PROVIDED THEREWITH

FIELD

The present disclosure relates generally to fuel injector assemblies for gas turbine combustors and, more particularly, to fuel injectors assemblies having bosses with cooling circuits for use with an axial fuel staging (AFS) system associated with such combustors.

BACKGROUND

Turbomachines are utilized in a variety of industries and applications for energy transfer purposes. For example, a gas turbine engine generally includes a compressor section, a combustion section, a turbine section (e.g., an expansion turbine section), and an exhaust section in serial flow order. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine engine via the exhaust section.

In some combustors, the generation of combustion gases occurs at two or more axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

AFS systems often include a boss that couples the fuel injector to the combustor. The boss may couple to the combustion liner of the combustor and thus be exposed directly to the high temperature combustion gases. The high temperature combustion gases may damage the boss and/or the fuel injector, thereby reducing the useful hardware life over time. As such, improved cooling systems for the boss of an AFS system would be advantageous.

BRIEF DESCRIPTION

Aspects and advantages of the combustor, boss, and method of fabricating the boss in accordance with the present disclosure will be set forth in part in the following description, or may be obvious from the description, or may be learned through practice of the technology.

In accordance with one embodiment, a combustor is provided. The combustor includes a combustion liner that defines a combustion chamber. The combustor further includes an outer sleeve spaced apart from the combustion liner such that an annulus is defined between the combustion liner and the outer sleeve. The combustor further includes a fuel injection assembly having a boss coupled to at least one of the combustion liner and the outer sleeve. The boss includes an inner flange coupled to the combustion liner, an outer flange spaced from the inner flange, and a body extending between the outer flange and the inner flange. The boss defines a cooling circuit having a post-impingement plenum defined in the inner flange between an inner wall of the inner flange and an impingement plate in cooling proximity to the inner wall; and a plurality of film cooling channels that are defined in the inner flange and that fluidly couple the post-impingement plenum to the combustion chamber.

In accordance with another embodiment, a boss for a fuel injection assembly is provided. The boss includes an outer flange. The boss further includes an inner flange that has an outer wall, an inner wall, and an impingement plate disposed between the outer wall and the inner wall. The boss further includes a body extending between the outer flange and the inner flange. The boss defines a cooling circuit. The cooling circuit includes a post-impingement plenum defined in the inner flange between the impingement plate and the inner wall. The cooling circuit further includes a plurality of film cooling channels that are defined through the inner wall and that fluidly couple to the post-impingement plenum.

In accordance with yet another embodiment, a method for fabricating a boss of a fuel injection assembly is provided. The method includes (a) irradiating a layer of powder in a powder bed to form a fused region, the powder bed disposed on a build plate. The method further includes (b) providing a subsequent layer of powder over the powder bed by passing a recoater arm over the powder bed from a first side of the powder bed. The method further includes (c) repeating steps (a) and (b) until the boss is formed on the build plate. The boss includes an outer flange. The boss further includes an inner flange that has an outer wall, an inner wall, and an impingement plate disposed between the outer wall and the inner wall. The boss further includes a body extending between the outer flange and the inner flange. The boss defines a cooling circuit. The cooling circuit includes a post-impingement plenum defined in the inner flange between the impingement plate and the inner wall. The cooling circuit further includes a plurality of film cooling channels that are defined through the inner wall and that fluidly couple to the post-impingement plenum.

These and other features, aspects and advantages of the present combustor, boss, and method of fabricating the boss will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustor, boss, and method of fabricating the boss, including the best mode of making and using the present systems and methods, directed to one of ordinary skill in the art, is set forth in the specification, which makes reference to the appended figures, in which.

DETAILED DESCRIPTION

Figure 1:
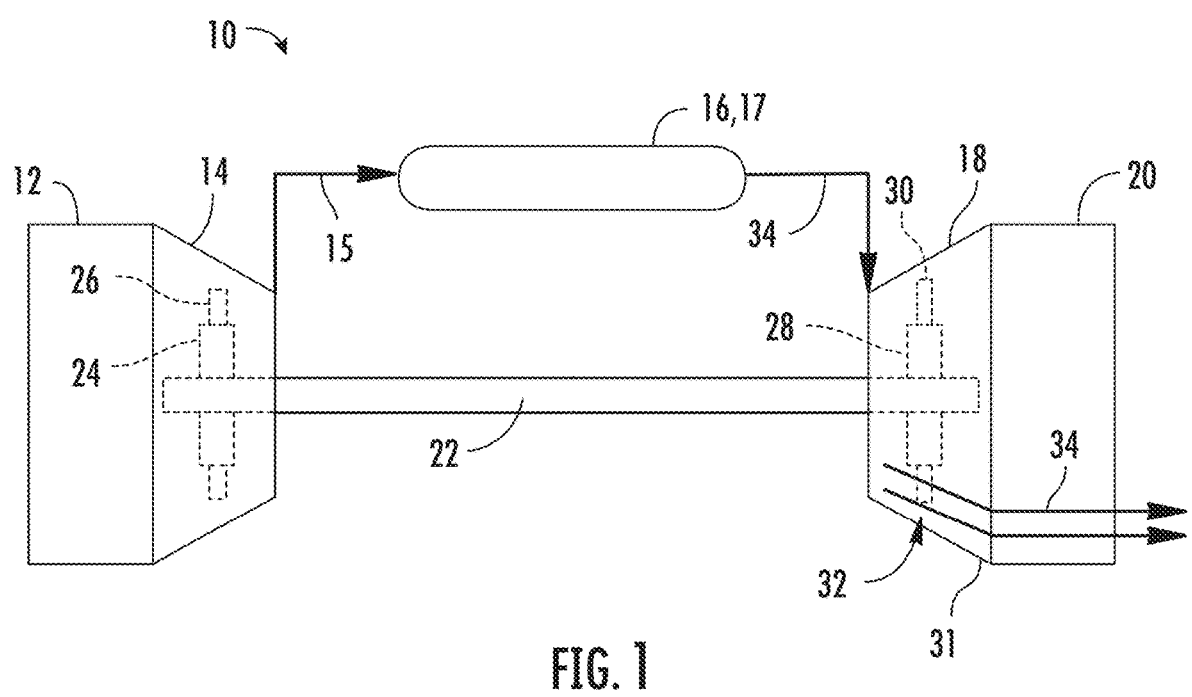
FIG. 1 is a schematic illustration of a turbomachine in accordance with embodiments of the present disclosure.

Reference now will be made in detail to embodiments of the present combustor, boss, and method of fabricating the boss, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, the phrase "and/or" is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine unless otherwise specified in the claims. For example, the technology as described herein may be used in any type of turbomachine including but not limited to a steam turbine, an aircraft gas turbine, or a marine gas turbine.

As shown, gas turbine engine 10 generally includes an inlet section 12, a compressor section 14 disposed downstream of the inlet section 12, a plurality of combustors 17

(shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine engine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form an upstream portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a downstream portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades and stationary vanes, thus providing pressurized air to the combustors 17 of the combustion section 16. The pressurized air is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
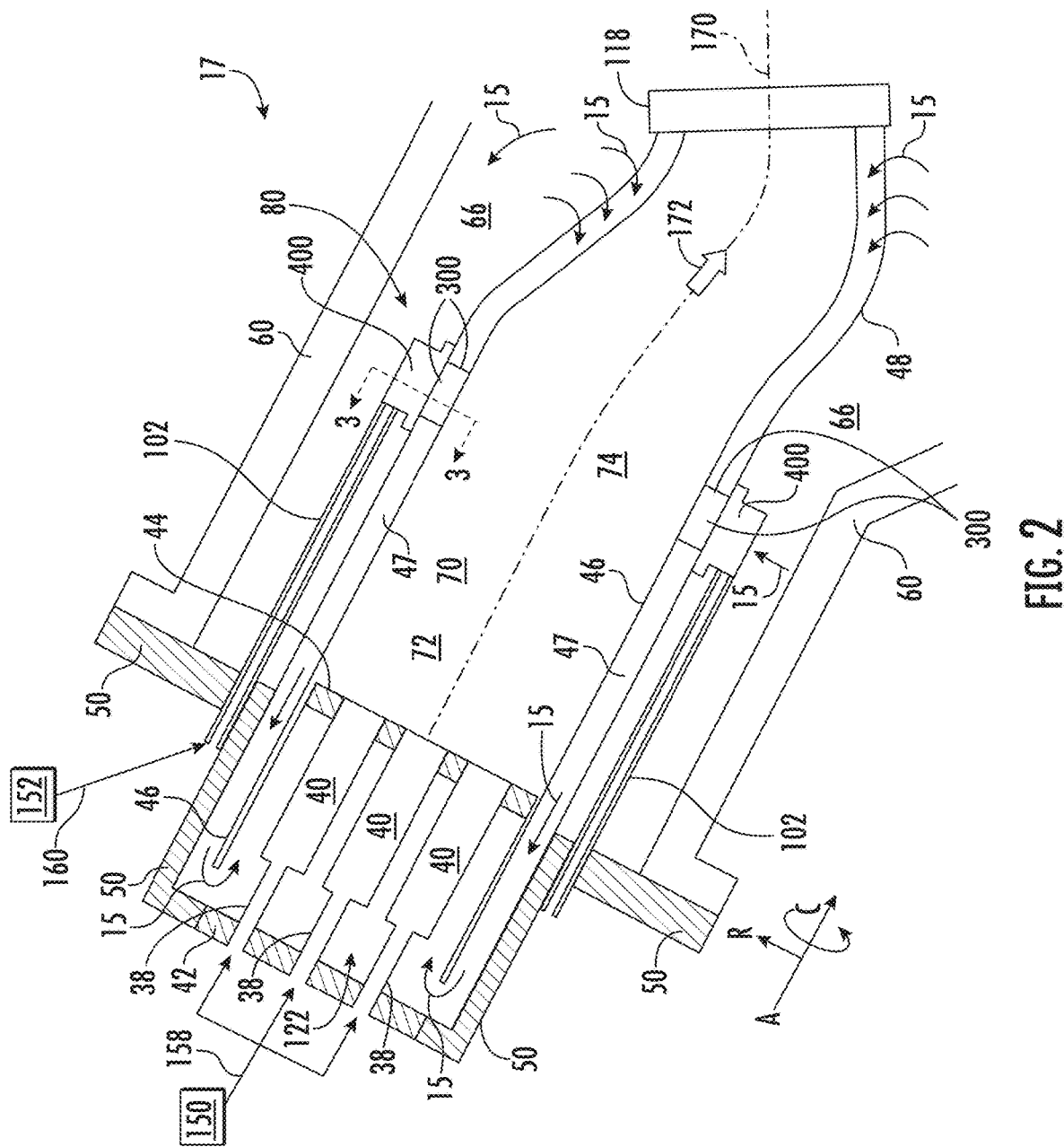
FIG. 2 schematically illustrates a cross-sectional view of a combustor in accordance with embodiments of the present disclosure, as may be used with the turbomachine of FIG. 1.

FIG. 2 is a schematic representation of a combustor 17, as may be included in a can-annular combustion system 16 for the gas turbine engine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

As shown in FIG. 2, the combustor 17 includes a combustion liner 46 that defines a combustion chamber 70. The combustion liner 46 may be positioned within (i.e., circumferentially surrounded by) an outer sleeve 48, such that an annulus 47 is formed therebetween. The combustion liner 46 may contain and convey combustion gases to the turbine section 18. The combustion liner 46 defines the combustion chamber 70 within which combustion occurs. As shown in FIG. 2, the combustion liner 46 may extend between fuel nozzles 40 and an aft frame 118. The combustion liner 46 may have a generally cylindrical liner portion and a tapered transition portion that is separate from the generally cylindrical liner portion, as in many conventional combustion systems. Alternately, the combustion liner 46 may have a unified body (or "unibody") construction, in which the generally cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit (e.g., without aft frame 118), sometimes referred to as a "transition nozzle" or an "integrated exit piece."

FIG. 2 illustrates a combustor 17 having both fuel nozzles 40 and one or more fuel injection assemblies 80 (also referred to as an axial fuel staging (AFS) system), as discussed further herein. The at least one fuel nozzle 40 may be positioned at the forward end of the combustor 17. Fuel may be directed through fuel supply conduits 38, which extend through an end cover 42, and into the fuel nozzles 40. The fuel nozzles 40 convey the fuel and compressed air 15 into a primary combustion zone 72, where combustion occurs. In some embodiments, the fuel and compressed air 15 are combined as a mixture prior to reaching the primary combustion zone 72.

The combustion liner 46 may be surrounded by an outer sleeve 48, which is spaced radially outward of the combustion liner 46 to define an annulus 47 through which compressed air 15 flows to a forward, or head, end of the combustor 17. For example, compressed air 15 may enter the annulus 47 through the outer sleeve 48 (e.g., through impingement holes proximate the aft frame 118) and travel towards the end cover 42, such that the compressed air 15 within the annulus 47 flows opposite the direction of combustion gases 172 (34 in FIG. 1) within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The forward casing 50 and the end cover 42 of the combustor 17 define the head end air plenum 122, which includes the one or more fuel nozzles 40. The fuel nozzles 40 may be any type of fuel nozzle, such as bundled tube fuel nozzles (often referred to as "micromixers") or swirler nozzles (often referred to as "swozzles"). The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46 or a cylindrical inlet flow conditioner (not separately labeled). The aft, or downstream ends, of the fuel nozzles 40 extend through or collectively define a cap plate 44 that defines the upstream end of the combustion chamber 70.

The fuel nozzles 40 may be in fluid communication with a first fuel supply 150 configured to supply a first fuel 158 to the fuel nozzles 40. In many embodiments, the first fuel 158 may be a fuel mixture containing natural gas (such as one or more of methane, ethane, propane, or other suitable natural gas) and hydrogen. In other embodiments, the first fuel 158 may be pure natural gas or pure hydrogen (e.g., 100% hydrogen, which may or may not contain some trace amount of contaminants), such that the first fuel is not a mixture of multiple fuels. In other embodiments, the first fuel 158 may be a mixture of hydrogen and natural gas, where hydrogen is the majority component (e.g., greater than 50%). In exemplary embodiments, the first fuel 158 and compressed air 15 may mix together within the fuel nozzles 40 to form a first mixture of compressed air 15 and the first fuel 158 before being ejected (or injected) by the fuel nozzles 40 into the primary combustion zone 72.

The forward casing 50 may be fluidly and mechanically connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near the aft frame 118). Compressed air 15 travels upstream through the annulus 47 and is turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, one or more fuel injection assemblies 80 are provided to deliver a second fuel/air mixture to a secondary combustion zone 74 downstream from the primary combustion zone 72. For example, a second flow of fuel 152 and air 15 may be introduced by one or more fuel injectors 400 to the secondary combustion zone 74.

The primary combustion zone 72 and the secondary combustion zone 74 may each be portions of the combustion chamber 70 and therefore may be defined by the combustion liner 46. For example, the primary combustion zone 72 may be defined from an outlet of the fuel nozzles 40 to the fuel injector 400, and the secondary combustion zone 74 may be defined from the fuel injector 400 to the aft frame 118. In this arrangement, the forwardmost boundary of the fuel injector 400 may define the end of the primary combustion zone 72 and the beginning of the secondary combustion zone 74 (e.g., at an axial location where a second flow of fuel and air are introduced).

Such a combustion system having axially separated combustion zones is described as an "axial fuel staging" (AFS) system. The fuel injection assemblies 80 may be circumferentially spaced apart from one another on the outer sleeve 48 (e.g., equally spaced apart in some embodiments). In many embodiments, the combustor 17 may include four fuel injection assemblies 80 spaced apart from one another and configured to inject a second mixture of fuel and air into a secondary combustion zone 74 via the fuel injector 400. In other embodiments, the combustor 17 may include any number of fuel injection assemblies 80 (e.g., 1, 2, 3, or up to 10).

As shown in FIG. 2, each fuel injection assembly 80 may include a fuel injector 400 and a boss 300 circumferentially and axially aligned with the fuel injector 400. The fuel injector 400 may be coupled to the boss 300 in many embodiments. In some embodiments (not shown), the fuel injector 400 may be radially spaced apart from the boss 300. The boss 300 may extend through the annulus 47 and couple to one of or both the combustion liner 46 and the outer sleeve 48. In some embodiments, the boss 300 may be coupled to one of the combustion liner 46 and the outer sleeve 48 and may be contact with the other of the combustion liner 46 and the outer sleeve 48. Such coupling may be direct or indirect.

A fuel supply conduit 102 may fluidly couple to the fuel injector 400. The fuel injector 400 may be in fluid communication with a second fuel supply 152 configured to supply a second fuel 160 to the fuel injector 400 via the fuel supply conduit 102. The second fuel supply 152 may be the same or different than the first fuel supply 150, such that the fuel injector 400 may be supplied with the same fuel or a different fuel than the fuel nozzles 40. In many embodiments, the second fuel 160 may be a fuel mixture containing natural gas (such as one or more of methane, ethane, propane, or other suitable natural gas) and hydrogen. In other embodiments, the second fuel 160 may be pure natural gas or pure hydrogen (e.g., 100% hydrogen, which may or may not contain some trace amount of contaminants), such that the first fuel is not a mixture of multiple fuels. In other embodiments, the second fuel 160 may be a mixture of hydrogen and natural gas, where hydrogen is the majority component (i.e., greater than 50%). In exemplary embodiments, the second fuel 160 and compressed air 15 may mix together within the fuel injector 400 to form a mixture of compressed air 15 and the second fuel 160 before being injected through the boss 300 and into the combustion chamber 70 and, more specifically, into the secondary combustion zone 74.

Figure 3:
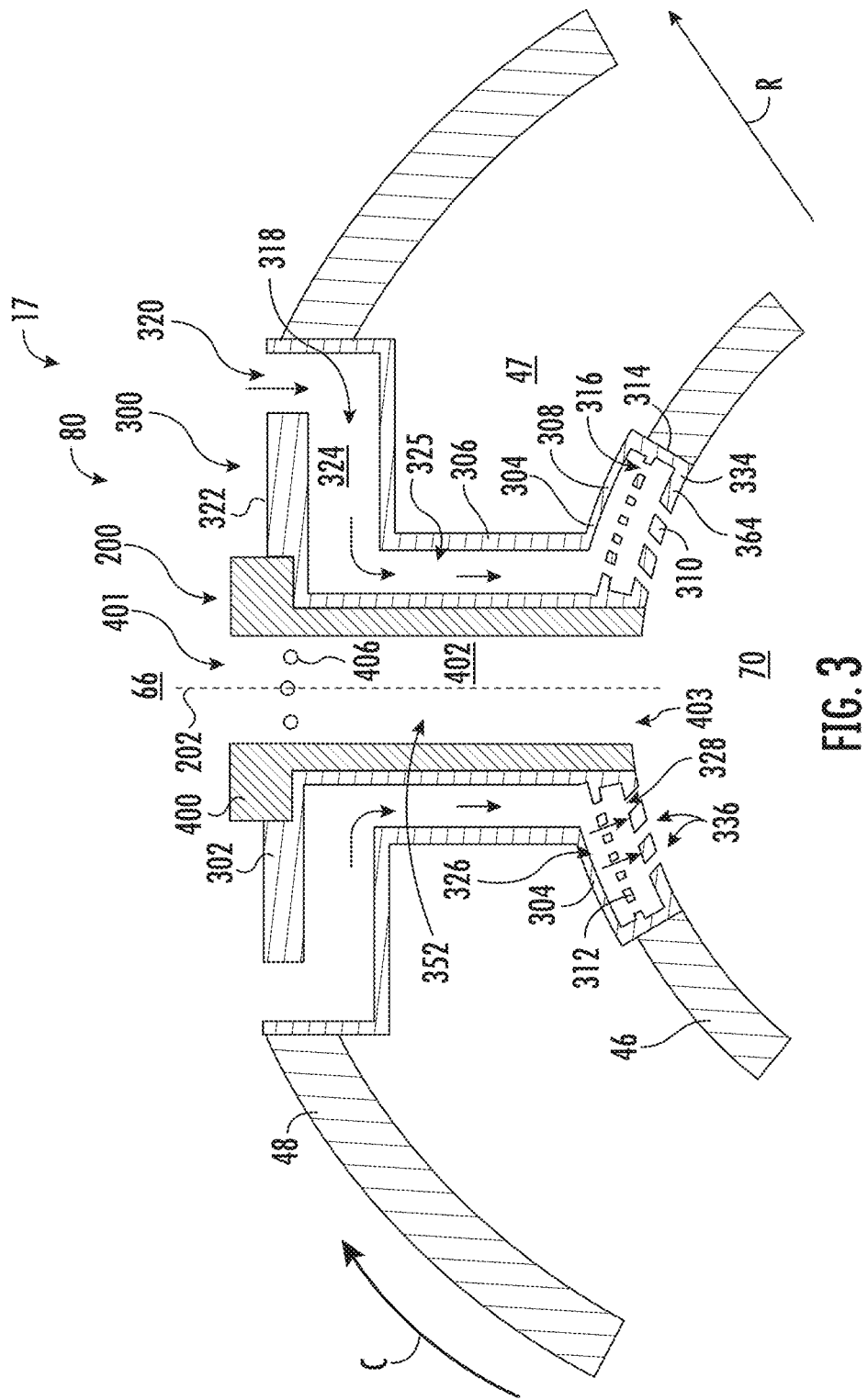
FIG. 3 schematically illustrates a cross-sectional view of a fuel injection assembly of an axial fuel staging system of the combustor, taken along the line 3-3 shown in FIG. 2, in accordance with embodiments of the present disclosure.

Referring now to FIG. 3, a schematic, cross-sectional view of the combustor 17, taken from along the line 3-3 shown in FIG. 2, is illustrated in accordance with embodiments of the present disclosure. As shown, the combustion liner 46 defines the combustion chamber 70. The outer sleeve 48 is spaced apart (e.g., radially) from the combustion liner 46 such that an annulus 47 is defined between the combustion liner 46 and the outer sleeve 48. The high pressure plenum 66 may be defined radially outwardly of the outer sleeve 48.

The fuel injection assembly 80 may be positioned within the annulus 47 and fluidly coupled to the combustion chamber 70 and the high pressure plenum 66. The fuel injection assembly includes the boss 300 and the fuel injector 400 coupled to the boss 300. The fuel injector and the boss 300 may generally extend (e.g., radially, relative to combustor centerline 170) along an injection axis 202. In many embodiments, the boss 300 includes an outer flange 302, an inner flange 304, and a body 306. The outer flange 302 may be coupled to or contact the outer sleeve 48. In some embodiments, the outer flange 302 may be fixedly coupled to the outer sleeve 48 (e.g., via a weld joint and/or braze joint). In other embodiments, the outer flange 302 may be removably coupled to the outer sleeve 48 (e.g., via one or more fasteners). The inner flange 304 may be coupled to or contact the combustion liner 46. For example, the inner flange 304 may be fixedly coupled to the combustion liner 46 (e.g., via a weld joint and/or braze joint). The body 306 may extend (e.g., radially, relative to combustor centerline 170) between the outer flange 302 and the inner flange 304. It should be understood that the radial direction relative to the combustor centerline 170 may also be described as the axial direction relative to the injection axis 202 of the fuel injector assembly 80.

As shown, the boss 300 may define a main passage 352 extending through the outer flange 302, the body 306, and the inner flange 304. The main passage 352 may extend between the high pressure plenum 66 and the combustion chamber 70. The fuel injector 400 may be positioned at least partially within the main passage 352.

The inner flange 304 includes an outer wall 308, an inner wall 310, and an impingement plate 312 positioned between (e.g., radially) the outer wall 308 and the inner wall 310. The impingement plate 312 may define a plurality of impingement apertures 316. The impingement plate 312 may be said to be "in cooling proximity" to the inner wall 310, such that air flowing through the plurality of impingement apertures 316 is capable of cooling the inner wall 310. The inner flange 304 may further include a peripheral edge 314 extending radially between the inner wall 310 and the outer wall 308. The peripheral edge 314 may be fixedly coupled to the combustion liner 46 (e.g., via a weld joint or braze joint).

In exemplary embodiments, the boss 300 may define a cooling circuit 318 for cooling the boss 300 and/or the fuel injector 400. The cooling circuit 318 may be annular, such that the cooling circuit 318 is defined about (and surrounds) the injection axis 202. The cooling circuit 318 includes at least one inlet 320 defined in a radially outer surface 322 of the outer flange 302. In this way, the cooling circuit 318 may receive a flow of pressurized coolant (e.g., air) from the high pressure plenum 66 via the inlet(s) 320. The cooling circuit 318 may further include an inlet plenum 324 defined in the outer flange 302. The inlet plenum 324 may receive coolant (e.g., air) from the inlet(s) 320.

In many embodiments, the cooling circuit 318 may further include a pre-impingement plenum 326 defined in the inner flange 304 between (e.g., radially between) the outer wall 308 and the impingement plate 312. Additionally, the cooling circuit 318 may include a post-impingement plenum 328 defined in the inner flange 304 between the impingement plate 312 and the inner wall 310. The inlet plenum 324 may be fluidly coupled to the pre-impingement plenum 326 via a passage 325 defined in the body 306. The passage 325 may extend (e.g., radially) through the body 306 between the inlet plenum 324 and the pre-impingement plenum 326. In one embodiment, the passage 325 may extend circumferentially around the body 306, while in other embodiments, two or more passages 325 may extend partially around the circumference of the body 306.

The pre-impingement plenum 326 and the post-impingement plenum 328 may be fluidly coupled to each other via the plurality of impingement apertures 316 defined in the impingement plate 312. In exemplary embodiments, the cooling circuit 318 may further include a plurality of film cooling apertures 336 defined in the inner wall 310 of the inner flange 304 and fluidly coupled to the combustion chamber 70. Specifically, the plurality of film cooling apertures 336 may extend through the inner wall 310 between the post-impingement plenum 328 and the combustion chamber 70. That is, the plurality of film cooling apertures 336 may extend from the post-impingement plenum 328 to exhaust coolant (e.g., air) from the cooling circuit 318 into the combustion chamber 70. The plurality of film cooling apertures 336 may each define a diameter that is greater than a diameter of each of the impingement apertures 316. In other words, each of the impingement apertures 316 may define a diameter that is smaller than a diameter of each of the film cooling apertures 336. The impingement apertures 316 may meter the flow of coolant (e.g., air) through the cooling circuit 318.

As shown in FIG. 3, the inner wall 310 may partially define the combustion chamber 70 and define the plurality of film cooling apertures 336. The inner wall 310 may include a solid portion 364 extending (e.g., generally circumferentially) between the plurality of apertures 336 and the peripheral edge 314. The solid portion 364 may not include any holes, apertures, voids, or other openings, such that no fluid communication is provided through the solid portion 364 of the inner wall 310. In various embodiments, as shown, the solid portion may be disposed between the plurality of apertures 336 and the peripheral edge 314. The plurality of apertures 336 may be disposed between the main passage 352 and the solid portion 364.

Figure 4:
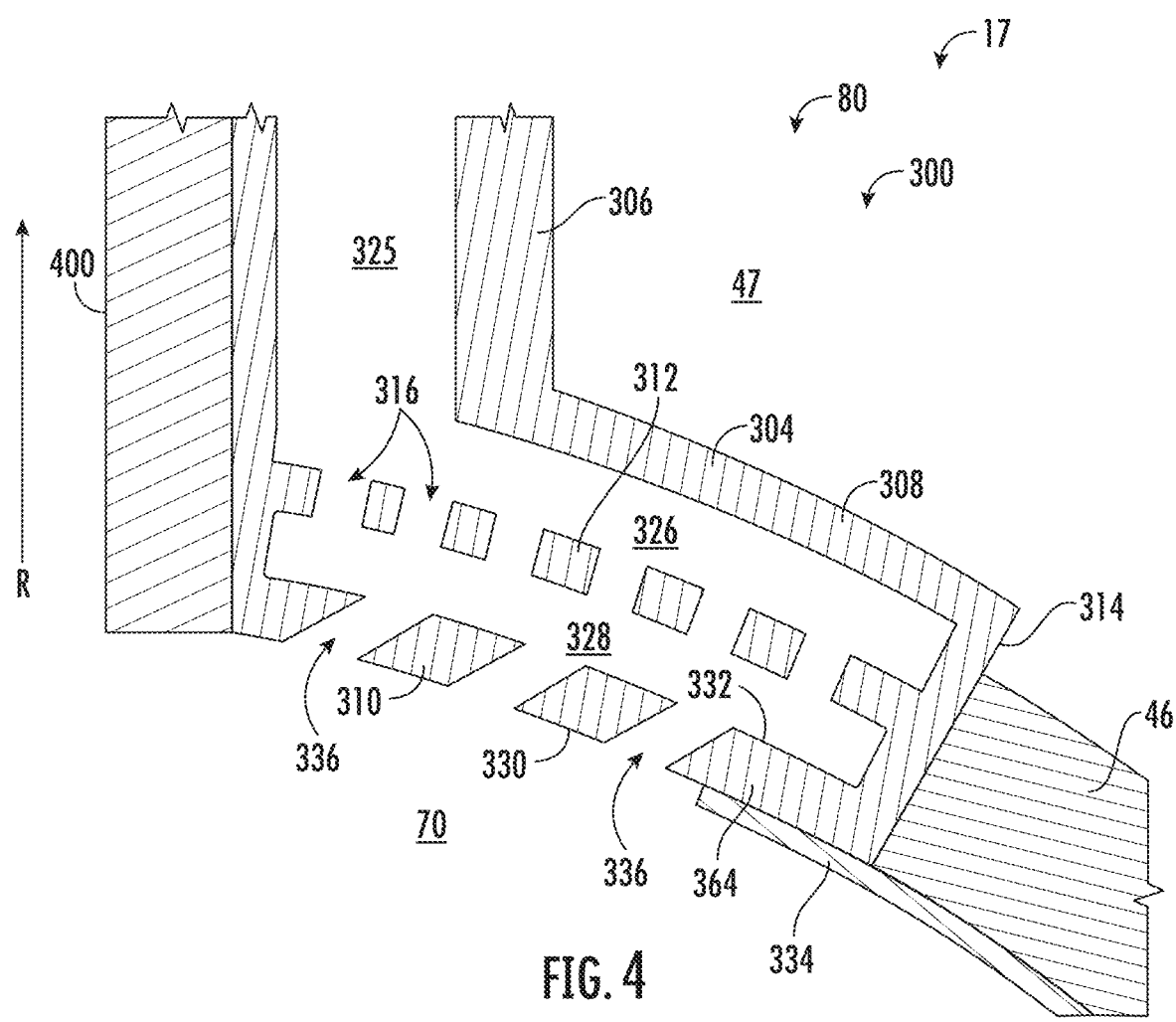
FIG. 4 schematically illustrates an enlarged view of a portion of a boss of the fuel injection assembly of the combustor from FIG. 3, in accordance with embodiments of the present disclosure.

In many embodiments, as shown in FIG. 4, a thermal barrier coating 334 ("TBC") may be disposed on the solid portion 364 of the inner wall 310 and/or on an innermost surface of the combustion liner 46. Specifically, the TBC 334 may be disposed on the solid portion 364 of an innermost surface of the inner wall 310. For example, the innermost surface of the inner flange 304 may at least partially define the combustion chamber 70 (and thus be exposed directly to the combustion gases flowing therethrough). The TBC 334 may increase the resistance of the boss 300 to the high temperatures of the combustion gases, thereby preserving the useful hardware life of the boss 300.

As shown in FIG. 3, the fuel injection assembly 80 may further include a fuel injector 400 coupled to the boss 300. The fuel injector 400 may extend through, and be positioned at least partially in, the main passage 352 of the boss 300. The fuel injector 400 may include an injection passage 402 that extends along the injection axis 202 from a main inlet 401 to a main outlet 403. The injection passage 402 of the fuel injector 400 may receive air from the high pressure plenum 66 and fuel from fuel ports 406, which mix within the injection passage 402 and are provided as a fuel/air mixture to the combustion chamber 70. More specifically, the fuel/air mixture is provided to the secondary combustion zone 74 radially inward of the fuel injection assembly 80. Different types of fuel injectors 400 may be used with the boss 300.

Referring now to FIG. 4, an enlarged view of a portion of a boss 300 of the fuel injection assembly 80 of FIG. 3 is illustrated. That is, FIG. 4 illustrates a radially inward portion of the fuel injection assembly 80, as coupled to the combustion liner 46. As shown in FIG. 4, the inner wall 310 may define an exterior surface 330 and an interior surface 332. In exemplary embodiments, the exterior surface 330 may be the innermost surface of the inner flange 304, such that the TBC 334 is disposed on the exterior surface 330 at the solid portion 364. That is, the exterior surface 330 of the solid portion 364 may be coated with the TBC 334 to increase the thermal and/or oxidation resistance of the boss 300 to the hot combustion gases (172 in FIG. 2), while the portion of the exterior surface 330 having the film cooling apertures 336 remains uncoated by the TBC 334.

The plurality of impingement apertures 316 may each be sized and oriented to direct coolant (e.g., air) from the pre-impingement plenum 326 in discrete jets to impinge upon the inner wall 310 (specifically an interior surface 332 of the inner wall 310). The discrete jets of air impinge (or strike) the interior surface 332, which allows for optimal heat transfer between the inner wall 310 and the air in the post-impingement plenum 328. For example, the impingement apertures 316 may orient coolant air such that it is perpendicular to the surface upon which it strikes, e.g. the interior surface 332 of the inner wall 310. Once the air has impinged upon the inner wall 310, it may be referred to as "post-impingement air" and/or "spent cooling air" because the air has undergone an energy transfer and therefore has different characteristics. For example, the spent cooling air may have a higher temperature and lower pressure than the pre-impingement air (i.e., coolant in the pre-impingement plenum 326) because the spent cooling air has removed heat from the inner wall 310 during the impingement process.

A primary function of the impingement apertures 316 may be to cool the inner wall 310 of the boss 300, thereby preserving the life of the boss 300 and protecting against the high temperature combustion gases within the combustion chamber 70. As a secondary function, at least one or more impingement apertures 316 may radially overlap with the TBC 334 (e.g., along the perimeter of the inner wall 310), such that impingement air from the impingement apertures 316 may be utilized to preserve the TBC 334 disposed along the perimeter of the exterior surface 330, thereby increasing the hardware life of the boss 300. For example, cooling the inner wall 310 may protect the boss 300 from the high temperature combustion gases and may at least partially prevent the TBC 334 experiencing spallation or separation from the exterior surface 330 due to heat from the combustion chamber 70.

The plurality of film cooling apertures 336 may advantageously provide a thin protective layer of air over the exterior surface 330 of the inner wall 310, thereby preserving the life of the boss 300. The plurality of film cooling apertures 336 may extend at an angle relative to the surfaces 332, 330 of the inner wall 310 through which the film cooling apertures 336 are defined. For example, at least a majority of, if not all, the film cooling apertures 336 defined through the inner wall 310 will extend at an angle (i.e., not perpendicularly) to the interior surface 332 and/or the exterior surface 330. Particularly, the film cooling apertures 336 may each extend from the post impingement plenum 328, towards the main passage 352, to the combustion chamber 70, such that the film cooling apertures 336 are slanted or sloped towards the main passage 352.

Each impingement cooling aperture 316 may be radially staggered relative to an inlet of the film cooling hole 336, such that the impingement cooling aperture 316 guides coolant (e.g., air) to impinge (or strike) the interior surface 332 (e.g., rather than being directed directly into the film cooling hole 336). Additionally, the plurality of impingement cooling apertures 316 may be arranged to prevent cross flow (e.g., flow vortices) withing the post-impingement plenum 328.

Figure 5:
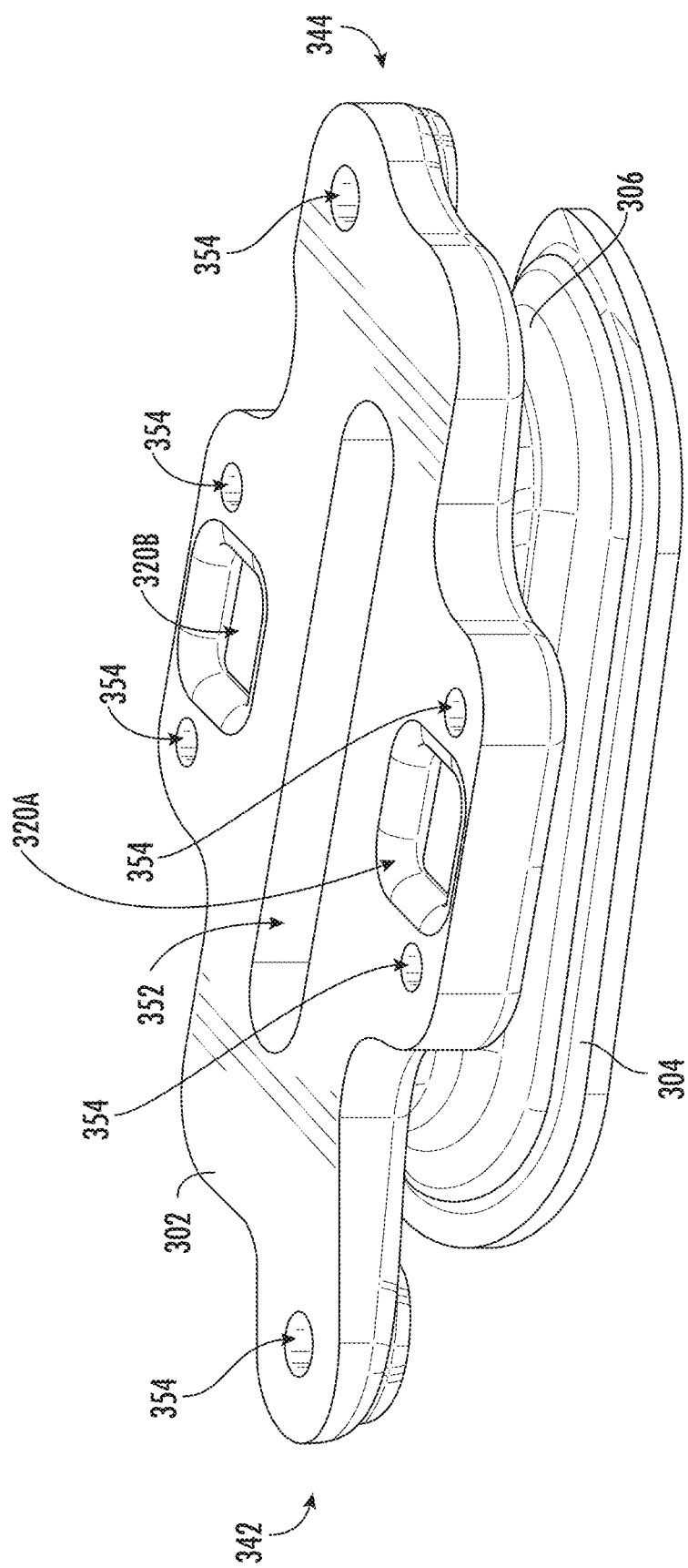
FIG. 5 illustrates a perspective view of a boss used in the fuel injection assembly of FIGS. 3-4, in accordance with embodiments of the present disclosure.

Referring now to FIG. 5, a perspective view of a boss 300 is illustrated in accordance with embodiments of the present disclosure. As shown, the boss 300 may extend generally axially between a forward end 342 and an aft end 344. The boss 300 may define the main passage 352 extending through the outer flange 302, the body 306, and the inner flange 304. The main passage 352 may be generally shaped as a slot or a geometric stadium (e.g., a rectangle having circular or rounded ends), although other shapes may be used. Additionally, as shown, the cooling circuit 318 may include at least two inlets 320A, 320B disposed on opposite sides of the main passage 352 (e.g., diametrically opposed from one another). Specifically, the cooling circuit 318 may include a first inlet 320A on a first side of the main passage 352 and a second inlet 320B disposed on a second side of the main passage 352. The inlets 320A, 320B may be generally rectangularly shaped (however, other shapes may be possible, such as circular). In many embodiments, the boss 300 may include other openings that are not in fluid communication with the cooling circuit 318, such as bolt holes, dowel holes, or other openings. For example, the outer flange 302 may define bolt holes 354 for coupling the outer flange 302 to the outer sleeve 48 and/or to the fuel injector 400 (shown schematically in FIG. 3). In an exemplary arrangement, the first inlet 320A and the second inlet 320B may each be disposed between two bolt holes 354. At least one bolt hole 354 may be disposed at the forward end 342 and the aft end 344 of the boss 300.

Figure 6:
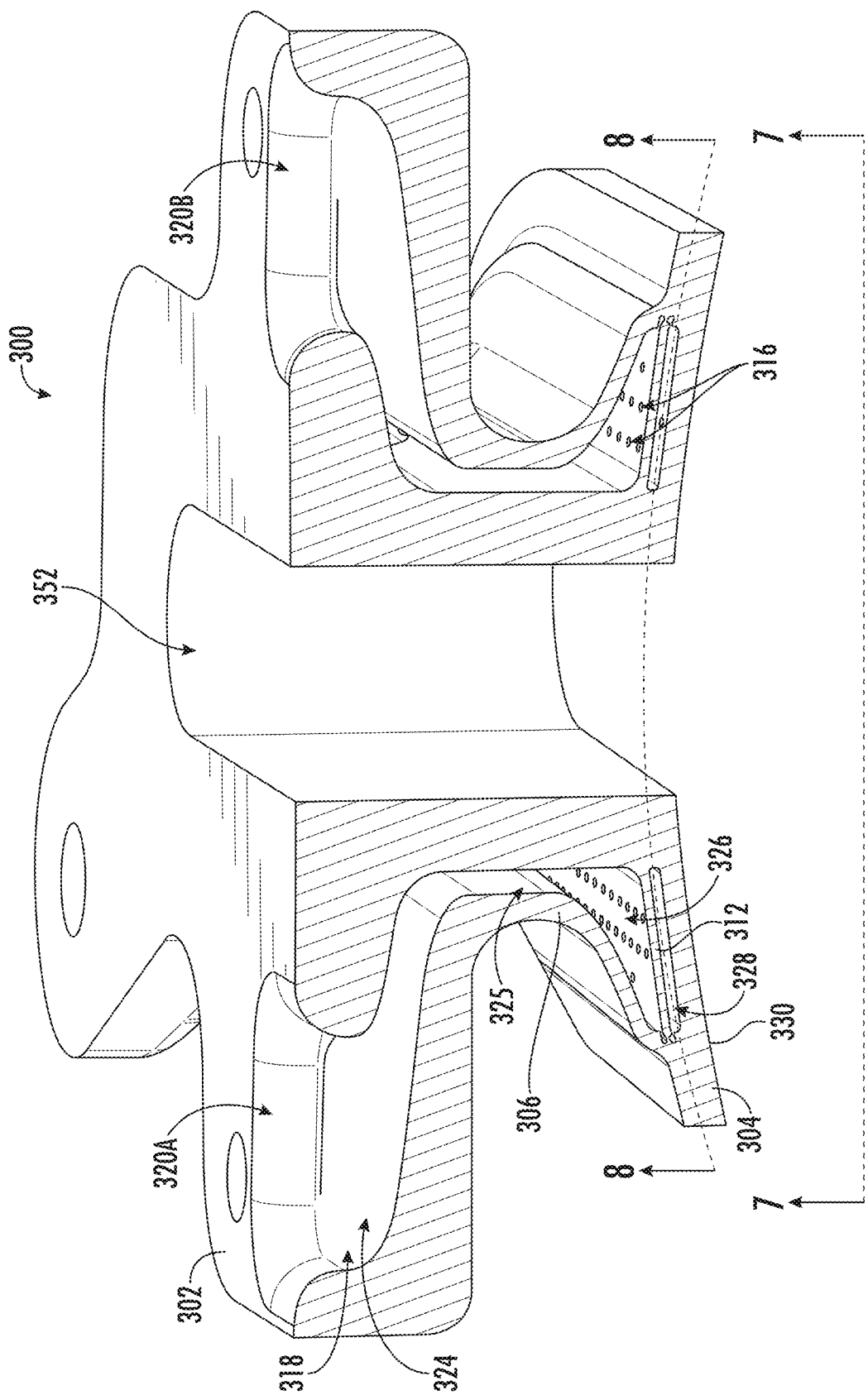
FIG. 6 illustrates a cross-sectional view of the boss shown in FIG. 5, in accordance with embodiments of the present disclosure.

Referring now to FIG. 6, a cross-sectional perspective view of a portion of the boss 300 depicting details of the cooling circuit 318 is illustrated in accordance with embodiments of the present disclosure. As shown in FIG. 6, the boss 300 includes the outer flange 302, the inner flange 304, and the body 306 extending between the outer flange 302 and the inner flange 304. The cooling circuit 318 may include the inlets 320A, 320B defined in the outer flange 302 and at least one inlet plenum 324 defined in the outer flange 302 and in fluid communication with at least one of the inlets 320A, 320B. The passage 325 may fluidly connect the inlet plenum 324 and the pre-impingement plenum 326. The boss 300 includes the impingement plate 312, which fluidly connects the pre-impingement plenum 326 and the post-impingement plenum 328 via the plurality of impingement apertures 316 (FIG. 4). The plurality of film cooling apertures 336 exhaust the coolant (e.g., air) from the post-impingement plenum 328 of the cooling circuit 318 to film cool the exterior surface 330 of the boss 300.

Figure 7:
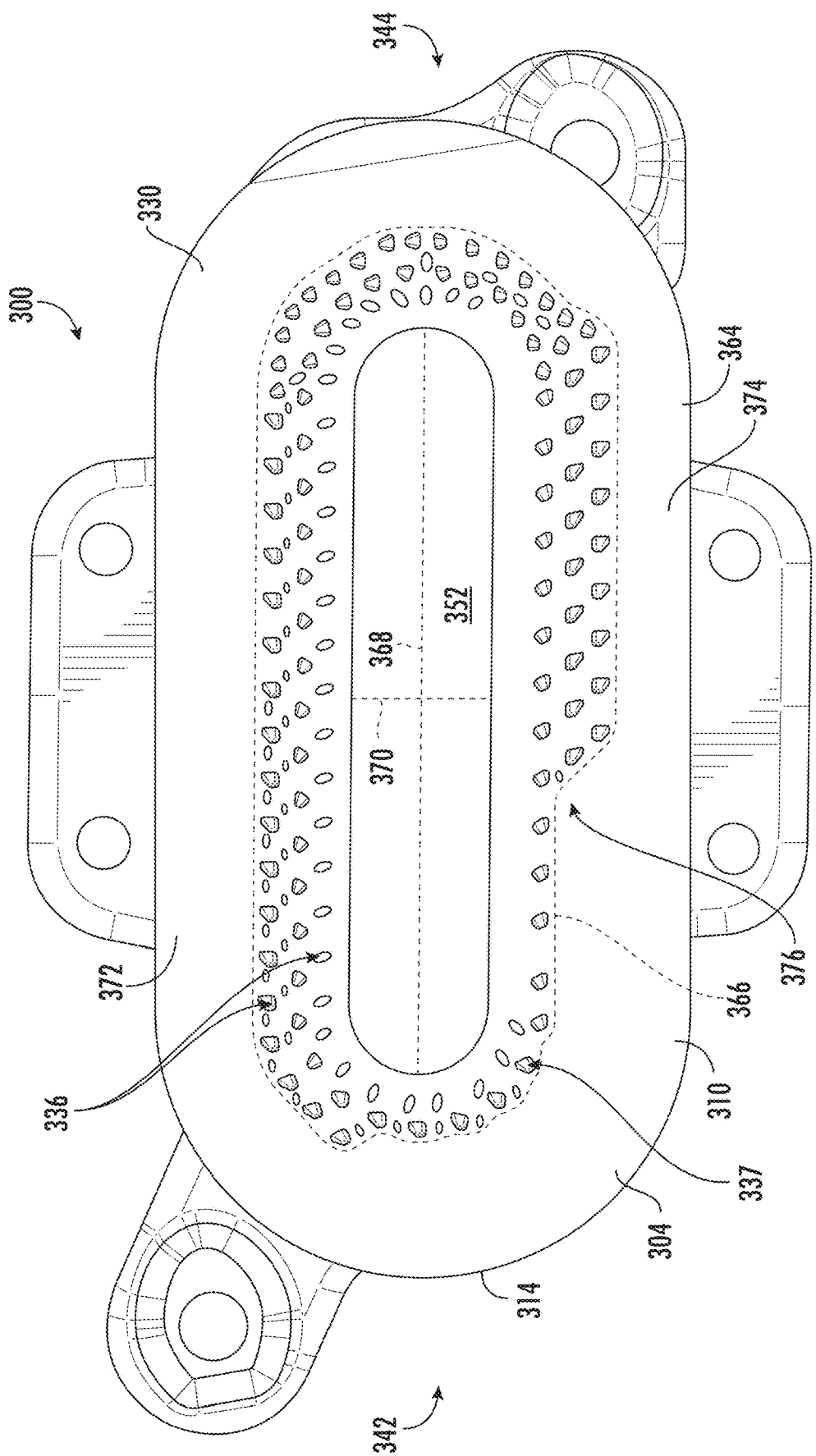
FIG. 7 illustrates a planar view of the boss shown in FIG. 6, taken along the line 7-7 of FIG. 6, in accordance with embodiments of the present disclosure.

Referring now to FIG. 7, a bottom-up planar view of the boss 300 shown in FIG. 6, taken from along the line 7-7 of FIG. 6, is illustrated in accordance with embodiments of the present disclosure. As shown, the boss 300 extends between the forward end 342 and the aft end 344. The boss 300 includes the main passage 352, which may be generally shaped as a geometric stadium (e.g., a rectangle having circular ends). Specifically, the main passage 352 extends along a major axis 368 and a minor axis 370. The major axis 368 is perpendicular to the minor axis 370. The main passage 352 may be longest along the major axis 368 and shortest along the minor axis 370.

The inner flange 304 extends to the peripheral edge 314. Specifically, the inner wall 310 of the inner flange 304 extends between the main passage 352 and the peripheral edge 314, while the outer wall 308 of the inner flange 304 extends between the body 306 and the peripheral edge 314. In exemplary embodiments, the inner wall 310 of the inner flange 304 includes the solid portion 364 proximate to the peripheral edge 314 on which the TBC 334 is applied. The phantom line 366 indicates a boundary line of where the TBC 334 (shown in FIGS. 3 and 4) is applied to the inner wall 310 of the boss 300. Specifically, the TBC 334 may be applied on the solid portion 364 between the phantom line 366 and the peripheral edge 314. As shown, the plurality of film cooling apertures 336 is disposed between the main passage 352 and the solid portion 364.

As shown in FIG. 7, the plurality of film cooling apertures 336 is arranged non-uniformly about the main passage 352. Particularly, the plurality of film cooling apertures 336 is arranged non-uniformly (e.g., not following a pattern) about the main passage 352 and disposed between the main passage 352 and the solid portion 364. The boss 300 may define more film cooling apertures 336 towards the aft end 344 than the forward end 342. Specifically, the boss 300 may define more film cooling apertures 336 between the minor axis 370 and the aft end 344 than between the minor axis 370 and the forward end 342 (e.g., about 30% more, or about 40% more, or about 50% more).

The non-uniform arrangement of film cooling apertures 336 shown in FIG. 7 has been analyzed using a computational fluid dynamics (CFD) system and has been shown to reduce thermal stresses in the boss 300 when implemented in a combustor (such as the combustor 17 shown and described above).

Additionally, as shown, the inner wall 310 of the boss 300 may include a first major portion 372 and a second major portion 374 each extending alongside the major axis 368. For example, the first major portion 372 and the second major portion 374 may each be spaced apart from the major axis 368 and may extend generally parallel to the major axis 368. The first major portion 374 may define more film cooling apertures 336 than the second major portion 374. On both the first major portion 372 and the second major portion 374, the plurality of film cooling apertures 336 may be arranged in one or more rows (which may extend alongside the major axis 368, e.g., spaced apart from the major axis 368 but disposed on an imaginary line that is parallel to the major axis 368). The second major portion 374 may include a stepped region 376 at which the boss 300 transitions from having one row of film cooling apertures 336 to having a plurality of rows of film cooling apertures 336 (e.g., three rows of film cooling apertures).

In many embodiments, as shown, each film cooling aperture 336 may extend to an outlet 337 defined on the exterior surface 330 of the inner wall 310. In exemplary embodiments, at least one film cooling aperture 336 of the plurality of film cooling apertures 336 may include a non-circularly shaped outlet 337. However, in other embodiments, the outlet 337 may have any particular shape (such as circular, oval, rectangular, triangular, or other shapes), and the outlet 337 should not be limited to any particular shape unless specifically recited in the claims. The non-circular shape of the outlet 337 may advantageously guide and direct the air being exhausted from the film cooling aperture 336 to form a protective layer over the exterior surface 330 of the boss 300, thereby preventing damage from high temperature combustion gases. That is, the purpose of the shape of the outlet 337 is to prevent cooling air from detaching from the surface of the boss 300 and from becoming entrained in combustion gases. The longer the cooling air remains attached to the surface of the boss 300, the greater the cooling performance. In addition, the angular orientation of the film cooling apertures 336 may vary around the perimeter of the main passage 352, thereby directing the cooling film across uncoated areas in proximity to the main passage 352. Because this uncoated area is sufficiently cooled by the film cooling apertures 336, the application of the TBC 334 may be limited to regions further from the main passage 352, thus avoiding application of the TBC 334 in those central areas that are more susceptible to spallation and separation. An added benefit is that the plurality of film cooling apertures 336 can be additively manufactured without concern of being filled by the TBC 334, which might otherwise need to be removed post-coating (or the apertures 336 re-drilled).

Figure 8:
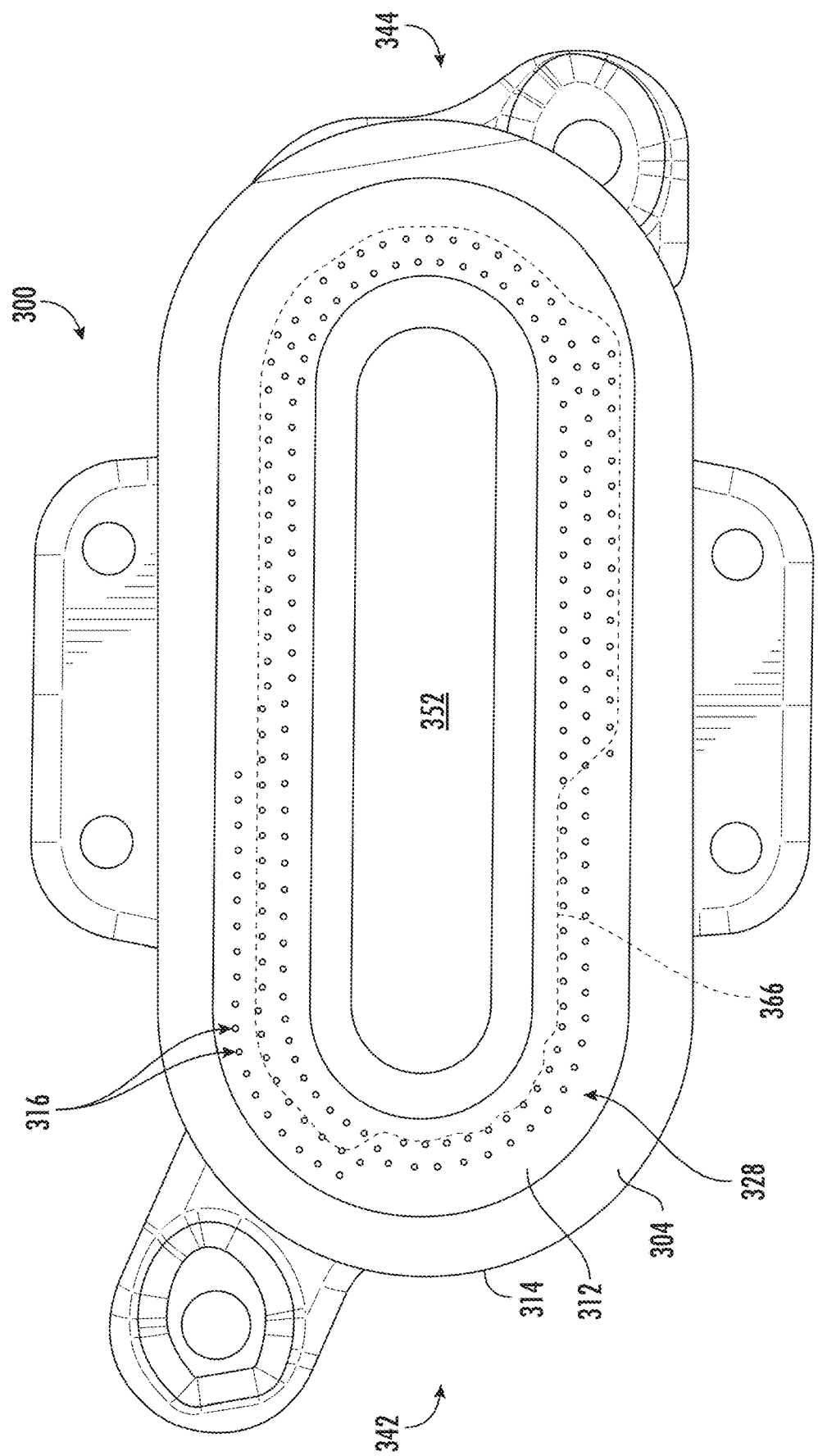
FIG. 8 illustrates a cross-sectional view of the boss shown in FIG. 6, taken along the line 8-8 of FIG. 6, in accordance with embodiments of the present disclosure.

Referring now to FIG. 8, a cross-sectional view of the boss 300 shown in FIG. 6, taken from along the curvilinear line 8-8 of FIG. 6, is illustrated in accordance with embodiments of the present disclosure. As shown, the impingement plate 312 may define the plurality of impingement apertures 316. The plurality of impingement apertures 316 may surround the main opening 352. The plurality of impingement apertures 316 may be arranged generally along the phantom line 366, which indicates the boundary line of the TBC 334 on the inner wall 310. Generally, as shown, the impingement apertures 316 may generally be arranged where no TBC 334 is present, such that the impingement apertures 316 provide additional cooling to the portions of the boss 300 not protected by a thermal barrier coating 334. For example, a majority of the impingement apertures, such as greater than 50%, or such as greater than 60%, may be disposed radially outwardly (e.g., relative to the combustor centerline axis 170) from a portion of the boss 300 that is not coated with a thermal barrier coating.

Figure 9:
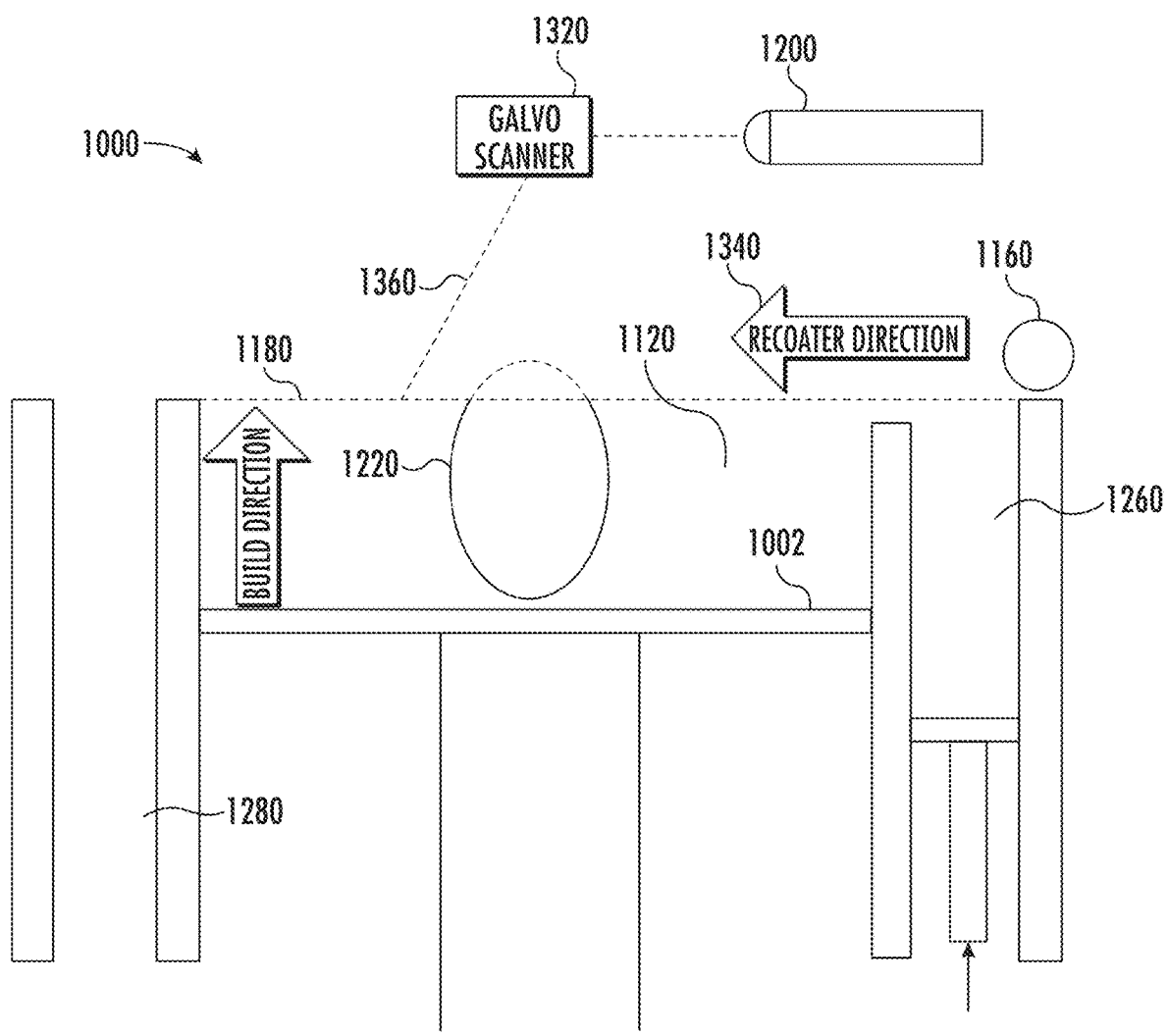
FIG. 9 is a schematic/block view of an additive manufacturing system for generating an object in accordance with embodiments of the present disclosure.

To illustrate an example of an additive manufacturing system and process, FIG. 9 shows a schematic/block view of an additive manufacturing system 1000 for generating an object 1220, such as boss 300 described herein. FIG. 9 may represent an additive manufacturing system configured for direct metal laser sintering (DMLS) or direct metal laser melting (DMLM). The additive manufacturing system 1000 fabricates objects, such as the object 1220 (which may be representative of the boss 300 described herein). For example, the object 1220 may be fabricated in a layer-by-layer manner by sintering or melting a powder material (not shown) using an energy beam 1360 generated by a source such as a laser 1200. The powder to be melted by the energy beam is supplied by reservoir 1260 and spread evenly over a build plate 1002 using a recoater arm 1160 to maintain the powder at a level 1180 and to remove excess powder material extending above the powder level 1180 to waste container 1280. The recoater arm 1160 moves in a recoater direction 1340 to spread the powder over the build plate 1002. The energy beam 1360 sinters or melts a cross-sectional layer of the object 1220 being built under control of the galvo scanner 1320. The build plate 1002 is lowered, and another layer of powder is spread over the build plate and the object being built, followed by successive melting/sintering of the powder by the laser 1200. The process is repeated until the object 1220 is completely built up from the melted/sintered powder material. The laser 1200 may be controlled by a computer system including a processor and a memory. The computer system may determine a scan pattern for each layer and control laser 1200 to irradiate the powder material according to the scan pattern. After fabrication of the object 1220 is complete, various post-processing procedures may be applied to the object 1220. Post-processing procedures include removal of excess powder by, for example, blowing or vacuuming. Other post-processing procedures include a stress release process. Additionally, thermal and chemical post-processing procedures can be used to finish the object 1220 (e.g., the selective application of the TBC layer 334 to the solid areas 364 adjacent the peripheral edge 314).

Figure 10:
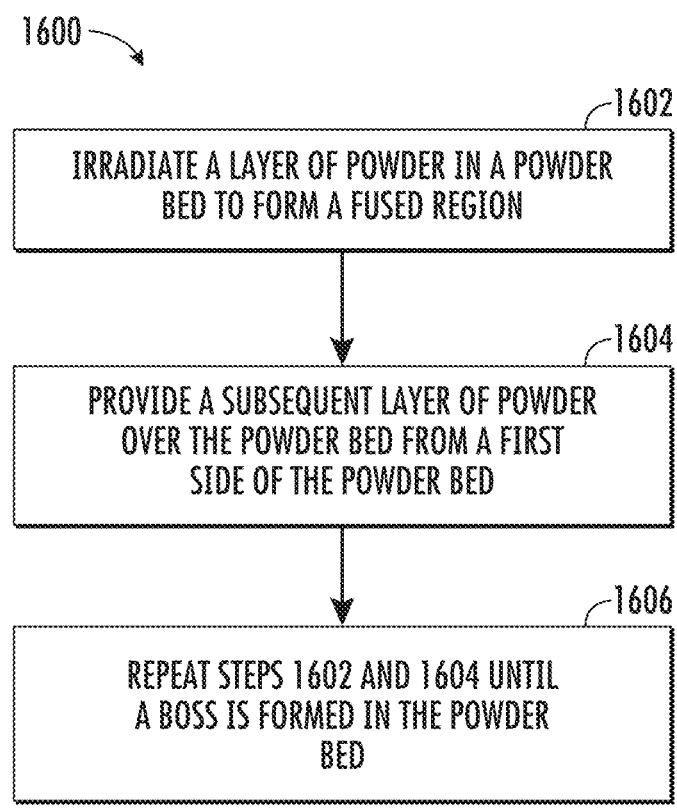
FIG. 10 is a flow chart of a method for fabricating a boss in accordance with embodiments of the present disclosure.

FIG. 10 is a flow chart of a sequential set of steps 1602 through 1606, which define a method 1600 of fabricating boss 300 in accordance with embodiments of the present disclosure. The method 1600 may be performed using an additive manufacturing system, such as the additive manufacturing system 1000 described herein or another suitable system. As shown in FIG. 10, the method 1600 includes a step 1602 of irradiating a layer of powder in a powder bed 1120 to form a fused region. In many embodiments, as shown in FIG. 9, the powder bed 1120 may be disposed on the build plate 1002, such that the fused region is fixedly attached to the build plate 1002. The method 1600 may include a step 1604 of providing a subsequent layer of powder over the powder bed 1120 from a first side of the powder bed 1120 (e.g., applied in the recoater direction 1340). The method 1600 further includes a step 1606 of repeating steps 1602 and 1604 until the boss 300 is formed in the powder bed 1120.

In many embodiments, the boss 300 described herein may be integrally formed as a single component. That is, each of the subcomponents, e.g., the flanges 302, 304 and the body 306, and any other subcomponent of the boss 300 (e.g., the impingement plate 312), may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the boss 300 may be integrally formed as a single piece of continuous metal and may thus include fewer sub-components and/or joints compared to prior designs. The integral formation of the boss 300 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. Further, the integral formation of the boss 300 may favorably reduce the weight of the boss 300 as compared to other manufacturing methods.

In exemplary embodiments, the method may further include applying a thermal barrier coating 334 to the solid portion 364 after the boss 300 is fully fabricated using the additive manufacturing system. The thermal barrier coating may be sprayed, brushed, and/or bonded onto the solid portion 364 of the boss 300. In many embodiments, the method 1600 may include installing the boss into a combustor 17.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor comprising: a combustion liner defining a combustion chamber; an outer sleeve spaced apart from the combustion liner such that an annulus is defined between the combustion liner and the outer sleeve; and a fuel injection assembly having a boss coupled to at least one of the combustion liner and the outer sleeve, the boss having an inner flange coupled to the combustion liner, an outer flange spaced from the inner flange, and a body extending between the inner flange and the outer flange, the boss defining a cooling circuit comprising: a post-impingement plenum defined in the inner flange between an inner wall of the inner flange and an impingement plate in cooling proximity to the inner wall; and a plurality of film cooling apertures that are defined in the inner flange and that fluidly couple the post-impingement plenum to the combustion chamber.

The combustor as in any preceding clause, wherein at least one film cooling aperture of the plurality of film cooling apertures includes a non-circularly shaped outlet.

The combustor as in any preceding clause, wherein the inner flange includes an outer wall opposite the inner wall; wherein the impingement plate is positioned between the outer wall and the inner wall and defines a plurality of impingement apertures; and wherein the inner wall defines the plurality of film cooling apertures and partially defines the combustion chamber.

The combustor as in any preceding clause, wherein the cooling circuit further comprises: an inlet plenum defined in the outer flange; a pre-impingement plenum defined in the inner flange between the outer wall and the impingement plate; and a passage defined in the body and extending between the inlet plenum and the pre-impingement plenum.

The combustor as in any preceding clause, wherein a majority of the plurality of film cooling apertures extends at a non-perpendicular angle through the inner wall between the post-impingement plenum and the combustion chamber.

The combustor as in any preceding clause, wherein the boss defines a main passage extending through the outer flange, the body, and the inner flange.

The combustor as in any preceding clause, wherein the inner flange extends to a peripheral edge and includes an outer wall and the inner wall; wherein the inner wall partially defines the combustion chamber and defines the plurality of film cooling apertures; wherein the inner wall includes a solid portion between the plurality of film cooling apertures and the peripheral edge; and wherein the plurality of film cooling apertures is disposed between the main passage and the solid portion.

The combustor as in any preceding clause, wherein a thermal barrier coating (TBC) is disposed on the solid portion of the inner wall; and wherein regions of the inner wall having the plurality of film cooling apertures are devoid of the TBC.

The combustor as in any preceding clause, wherein the cooling circuit includes at least two inlets on opposite sides of the main passage.

The combustor as in any preceding clause, wherein the plurality of film cooling apertures is arranged non-uniformly about the main passage.

A boss for a fuel injection assembly, the boss comprising: an outer flange; an inner flange, the inner flange having an outer wall, an inner wall, and an impingement plate disposed between the outer wall and the inner wall; and a body extending between the outer flange and the inner flange, the boss defining a cooling circuit comprising: a post-impingement plenum defined in the inner flange between the impingement plate and the inner wall; and a plurality of film cooling apertures that extend through the inner wall and that fluidly couple to the post-impingement plenum.

The boss as in any preceding clause, wherein at least one film cooling aperture of the plurality of film cooling apertures includes a non-circularly shaped outlet.

The boss as in any preceding clause, wherein the boss defines a main passage extending through the outer flange, the body, and the inner flange; wherein the main passage extends along a major axis and a minor axis; and wherein the major axis is longer than the minor axis.

The boss as in any preceding clause, wherein the inner flange extends to a peripheral edge; wherein the inner wall includes a solid portion between the plurality of apertures and the peripheral edge; and wherein the plurality of apertures is disposed between the main passage and the solid portion.

The boss as in any preceding clause, wherein a thermal barrier coating (TBC) is disposed on the solid portion of the inner wall; and wherein regions of the inner wall having the plurality of film cooling apertures are devoid of the TBC.

The boss as in any preceding clause, wherein the cooling circuit includes at least two inlets on opposite sides of the main passage.

The boss as in any preceding clause, wherein the plurality of film cooling apertures is arranged non-uniformly about the main passage.

A method for fabricating a boss of a fuel injection assembly, the method comprising: (a) irradiating a layer of powder in a powder bed to form a fused region, the powder bed disposed on a build plate; (b) providing a subsequent layer of powder over the powder bed by passing a recoater arm over the powder bed from a first side of the powder bed; and (c) repeating steps (a) and (b) until the boss is formed on the build plate, wherein the boss comprises: an outer flange; an inner flange, the inner flange having an outer wall, an inner wall, and an impingement plate disposed between the outer wall and the inner wall; and a body extending between the outer flange and the inner flange; wherein the boss defines a cooling circuit comprising: a post-impingement plenum defined in the inner flange between the impingement plate and the inner wall; and a plurality of film cooling apertures that extend through the inner wall and that fluidly couple to the post-impingement plenum.

The method as in any preceding clause, wherein inner wall includes a solid portion devoid of the plurality of film cooling apertures; and wherein the method further includes applying a thermal barrier coating to the solid portion after the boss is fully fabricated without applying a thermal barrier coating to regions of the inner wall defining the plurality of film cooling apertures.

The method as in any preceding clause, wherein at least one film cooling aperture of the plurality of film cooling apertures includes a non-circularly shaped outlet.

What is claimed is:

1. A combustor comprising:
   a combustion liner defining a combustion chamber;
   an outer sleeve spaced apart from the combustion liner such that an annulus is defined between the combustion liner and the outer sleeve; and
   a fuel injection assembly having a boss coupled to at least one of the combustion liner and the outer sleeve, the boss having an inner flange coupled to the combustion liner, an outer flange spaced from the inner flange, and a body extending between the outer flange and the inner flange, wherein the inner flange includes an inner wall that partially defines the combustion chamber;
   wherein the boss defines a cooling circuit comprising:
      a post-impingement plenum defined in the inner flange between the inner wall of the inner flange and an impingement plate in cooling proximity to the inner wall; and
      a plurality of film cooling apertures that are defined in the inner wall of the inner flange, wherein the plurality of film cooling apertures fluidly couple the post-impingement plenum to the combustion chamber.

2. The combustor as in claim 1, wherein at least one film cooling aperture of the plurality of film cooling apertures includes a non-circularly shaped outlet.

3. The combustor as in claim 1, wherein the inner flange includes an outer wall opposite the inner wall; wherein the impingement plate is positioned between the outer wall and the inner wall and defines a plurality of impingement apertures.

4. The combustor as in claim 3, wherein the cooling circuit further comprises:
   an inlet plenum defined in the outer flange;
   a pre-impingement plenum defined in the inner flange between the outer wall and the impingement plate; and
   a passage defined in the body and extending between the inlet plenum and the pre-impingement plenum.

5. The combustor as in claim 4, wherein a majority of the plurality of film cooling apertures extends at a non-perpendicular angle through the inner wall between the post-impingement plenum and the combustion chamber.

6. The combustor as in claim 1, wherein the boss defines a main passage extending through the outer flange, the body, and the inner flange.

7. The combustor as in claim 6, wherein the inner flange extends to a peripheral edge and includes an outer wall and the inner wall; wherein the inner wall includes a solid portion between the plurality of film cooling apertures and the peripheral edge; and wherein the plurality of film cooling apertures is disposed between the main passage and the solid portion.

8. The combustor as in claim 7, wherein a thermal barrier coating (TBC) is disposed on the solid portion of the inner wall; and wherein regions of the inner wall having the plurality of film cooling apertures are devoid of the TBC.

9. The combustor as in claim 6, wherein the cooling circuit includes at least two inlets on opposite sides of the main passage.

10. The combustor as in claim 6, wherein the plurality of film cooling apertures is arranged non-uniformly about the main passage.

11. A boss for a fuel injection assembly, the boss comprising:
    an outer flange;
    an inner flange, the inner flange having an outer wall, an inner wall, and an impingement plate disposed between the outer wall and the inner wall; and
    a body extending between the outer flange and the inner flange, the boss defining a cooling circuit comprising:
       a post-impingement plenum defined in the inner flange between the impingement plate and the inner wall; and
       a plurality of film cooling apertures that extend through the inner wall and that fluidly couple to the post-impingement plenum.

12. The boss as in claim 11, wherein at least one film cooling aperture of the plurality of film cooling apertures includes a non-circularly shaped outlet.

13. The boss as in claim 11, wherein the boss defines a main passage extending through the outer flange, the body, and the inner flange; wherein the main passage extends along a major axis and a minor axis; and wherein the major axis is longer than the minor axis.

14. The boss as in claim 13, wherein the inner flange extends to a peripheral edge; wherein the inner wall includes a solid portion between the plurality of film cooling apertures and the peripheral edge; and wherein the plurality of film cooling apertures is disposed between the main passage and the solid portion.

15. The boss as in claim 14, wherein a thermal barrier coating (TBC) is disposed on the solid portion of the inner wall; and wherein regions of the inner wall having the plurality of film cooling apertures are devoid of the TBC.

16. The boss as in claim 13, wherein the cooling circuit includes at least two inlets on opposite sides of the main passage.

17. The boss as in claim 13, wherein the plurality of film cooling apertures is arranged non-uniformly about the main passage.

18. A method for fabricating a boss of a fuel injection assembly, the method comprising:
   (a) irradiating a layer of powder in a powder bed to form a fused region, the powder bed disposed on a build plate;
   (b) providing a subsequent layer of powder over the powder bed by passing a recoater arm over the powder bed from a first side of the powder bed; and
   (c) repeating steps (a) and (b) until the boss is formed on the build plate, wherein the boss comprises:
      an outer flange;
      an inner flange, the inner flange having an outer wall, an inner wall, and an impingement plate disposed between the outer wall and the inner wall; and
      a body extending between the outer flange and the inner flange, the boss defining a cooling circuit comprising:
         a post-impingement plenum defined in the inner flange between the impingement plate and the inner wall; and
         a plurality of film cooling apertures extending through the inner wall and fluidly coupled to the post-impingement plenum.

19. The method as in claim 18, wherein inner wall includes a solid portion devoid of the plurality of film cooling apertures; and wherein the method further includes applying a thermal barrier coating to the solid portion after the boss is fully fabricated without applying the thermal barrier coating to regions of the inner wall defining the plurality of film cooling apertures.

20. The method as in claim 18, wherein at least one film cooling aperture of the plurality of film cooling apertures includes a non-circularly shaped outlet.

\* \* \* \* \*